UNITED STATES PATENT OFFICE.

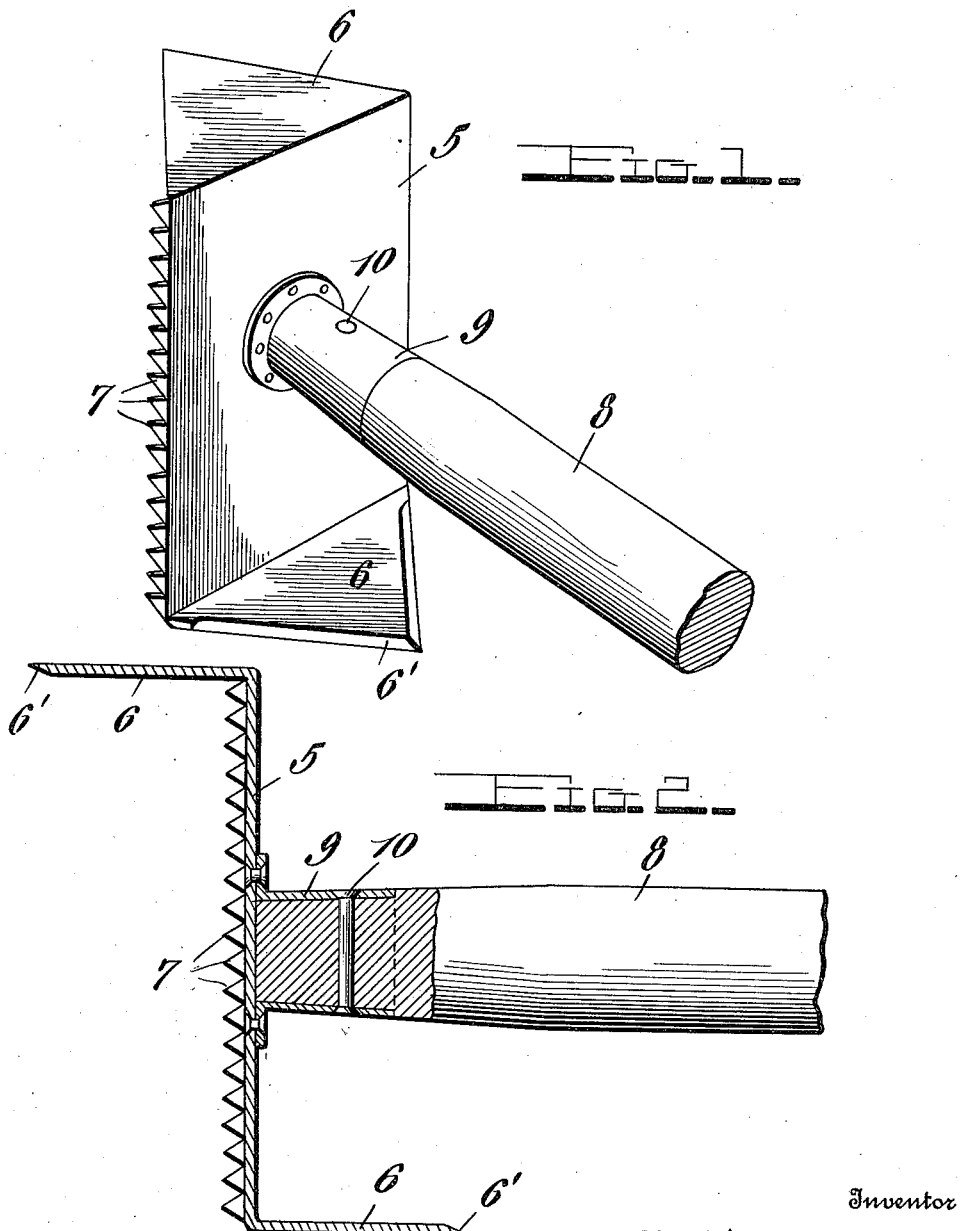

CASON F. ADAMS, OF PAVO, GEORGIA.

WEEDING-HOE.

1,006,819.  Specification of Letters Patent. Patented Oct. 24, 1911.

Application filed February 27, 1911. Serial No. 611,030.

*To all whom it may concern:*

Be it known that I, CASON F. ADAMS, a citizen of the United States, residing at Pavo, in the county of Thomas and State of Georgia, have invented certain new and useful Improvements in Weeding-Hoes, of which the following is a specification, reference being had to the accompanying drawings.

This invention relates to improvements in weeding hoes and has for its primary object to provide an agricultural implement of this character of simple and novel construction whereby weeds and other rank growths may be expeditiously destroyed with a minimum amount of labor.

A further object of my invention resides in the provision of a hoe blade having its opposite ends bent at right angles to the body of the blade and in different directions and provided with sharpened edges to cut or sever the stalks of the weeds.

Another object of the invention is to provide a hoe blade having a plurality of saw tooth edges whereby stalks of unusual thickness may be readily severed close to the ground surface.

With the above and other objects in view, the invention consists of the novel features of construction, combination and arrangement of parts hereinafter fully described and claimed, and illustrated in the accompanying drawings, in which—

Figure 1 is a perspective view of a hoe constructed in accordance with my invention; and Fig. 2 is a longitudinal section of the hoe blade.

Referring in detail to the drawing 5 designates the hoe blade which consists of the substantially rectangular body portion and the triangular end portions 6 which are bent at right angles to the body portion of the blade and extend in opposite directions. The edges of the triangular end portions of the blade are provided with sharpened cutting edges 6' and are adapted to sever the stalks of the weeds as the hoe is moved toward or from the operator. By disposing the triangular end portions of the blade in opposite directions, the hoe may be readily reversed by the operator and moved in either direction.

The longitudinal edges of the body of the blade 5 are formed with the saw teeth 7 extending outwardly at right angles thereto so that upon encountering a stalk of such thickness that it cannot be readily severed by the knife edges of the ends 6 of the blade, the operator simply positions one of the longitudinal saw tooth edges 7 upon the ground and moves the blade laterally back and forth whereby said stalk is easily and quickly cut through by the saw teeth. In this manner the ground may be rapidly cleared of weeds with but little labor or exertion on the part of the operator. The handle 8 may be secured to the body of the blade 5 in any well known manner, but as shown in the drawing one end of the same is disposed in a cylindrical socket 9 which is rigidly fixed centrally upon the hoe blade, suitable rivets 10 firmly securing the handle in said socket.

From the foregoing it is thought that the construction, operation and many advantages to be obtained by means of my improved hoe will be readily understood. The device is extremely simple, may be manufactured at small cost and is very convenient and highly efficient in practical use.

While I have shown and described the particular form and construction of the hoe blade, it will be obvious that the device is susceptible of a great many minor modifications without departing from the essential feature or sacrificing any of the advantages thereof.

Having thus described the invention what is claimed is:—

1. A hoe blade for the purpose set forth comprising a body having triangular end portions disposed at right angles to said body and extending in opposite directions, said end portions being provided with cutting edges.

2. A hoe blade comprising a body having end portions extending in opposite directions from said body and provided with cutting edges, and saw teeth formed on the longitudinal edges of said body.

3. A hoe blade comprising a body having its end portions disposed at right angles thereto and provided with cutting edges, and saw teeth formed on one of the longitudinal edges of the body and disposed at right angles thereto.

4. A hoe blade for the purpose set forth comprising a body having oppositely disposed end portions extending at right angles to the body and provided with cutting edges, and saw teeth formed upon each of the longitudinal edges of said body and extending at right angles thereto in the same direction.

In testimony whereof I hereunto affix my signature in the presence of two witnesses.

CASON F. ADAMS.

Witnesses:
H. K. McGraw,
W. L. Evans.

---

Copies of this patent may be obtained for five cents each, by addressing the "Commissioner of Patents, Washington, D. C."